United States Patent
Solihin

(10) Patent No.: US 8,924,754 B2
(45) Date of Patent: Dec. 30, 2014

(54) QUALITY OF SERVICE TARGETS IN MULTICORE PROCESSORS

(75) Inventor: Yan Solihin, Apex, NC (US)

(73) Assignee: Empire Technology Development LLC, Wilmington, DE (US)

( * ) Notice: Subject to any disclaimer, the term of this patent is extended or adjusted under 35 U.S.C. 154(b) by 239 days.

(21) Appl. No.: 13/636,523

(22) PCT Filed: Feb. 2, 2012

(86) PCT No.: PCT/US2012/023636
§ 371 (c)(1),
(2), (4) Date: Sep. 21, 2012

(87) PCT Pub. No.: WO2013/115821
PCT Pub. Date: Aug. 8, 2013

(65) Prior Publication Data
US 2013/0205141 A1   Aug. 8, 2013

(51) Int. Cl.
*G06F 1/00* (2006.01)
(52) U.S. Cl.
USPC ............ 713/322; 713/300; 718/104; 718/107
(58) Field of Classification Search
CPC ..... G06F 9/5077; G06F 9/50; G06F 11/3409; G06F 11/3466; G06F 1/3296; G06F 12/0848; G06F 2209/501
USPC ........................... 713/300, 322; 718/104, 107
See application file for complete search history.

(56) References Cited

U.S. PATENT DOCUMENTS

| | | | |
|---|---|---|---|
| 7,861,068 B2 | 12/2010 | Gorbatov et al. | |
| 2009/0249094 A1 | 10/2009 | Marshall et al. | |
| 2011/0047401 A1 | 2/2011 | Werner | |
| 2011/0239015 A1 | 9/2011 | Boyd et al. | |
| 2013/0111143 A1* | 5/2013 | Kurihara et al. | 711/131 |
| 2014/0115351 A1* | 4/2014 | Ananthakrishnan et al. | 713/300 |
| 2014/0164799 A1* | 6/2014 | Liu et al. | 713/320 |

OTHER PUBLICATIONS

International Search Report & Written Opinion dated Aug. 10, 2012 in PCT Application No. PCT/US12/23636.
Bitirgen, R. et al., "Coordinated Management of Multiple Interacting Resources in Chip Multiprocessors: A Machine Learning Approach," MICRO-41, Proceedings of the 41st annual IEEE/ACM International Symposium on Microarchitecture, 2008.

(Continued)

*Primary Examiner* — Jaweed A Abbaszadeh
(74) *Attorney, Agent, or Firm* — Hope Baldauff LLC

(57) ABSTRACT

Technologies are described herein for adapting a processor core on a multicore processor to achieve a quality of service target. Some example technologies may identify a target level of a resource on the computer. The technologies may identify a first utilization value and a second utilization value of the resource when the processor core operates at a first frequency and a second frequency. The technologies may generate a linear interpolation between a first point and a second point. Coordinates of the first point may include the first frequency and the first utilization value. Coordinates of the second point may include the second frequency and the second utilization value. The technologies may set the processor core to operate at a third frequency, which can be specified as one of the coordinates in an intersection point between the linear interpolation and the target level.

24 Claims, 10 Drawing Sheets

(56) References Cited

OTHER PUBLICATIONS

Choi, K. et al., "Dynamic Voltage and Frequency Scaling Based on Workload Decomposition," International Symposium on Low Power Electronics and Design (ISLPED'04), Aug. 9-11, 2004.

Kim, S. et al., "Fair Cache Sharing and Partitioning in a Chip Multiprocessor Architecture," Proceedings of the International Conference on Parallel Architectures and Compilation Techniques (PACT), 2004.

Liu, F. et al., "Understanding How Off-Chip Memory Bandwidth Partitioning in Chip Multiprocessors Affects System Performance," IEEE 16th International Symposium on High Performance Computer Architecture (HPCA), 2010.

Nesbit, K.J. et al., "Fair Queuing Memory Systems," The 39th Annual IEEE/ACM International Symposium on Microarchitecture (MICRO'06), 2006.

Nesbit, K.J. et al., "Virtual Private Caches," Proceedings of the 34th Annual International Symposium on Computer Architecture (ISCA'07), Jun. 9-13, 2007.

Rafique, N. et al., "Effective Management of DRAM Bandwidth in Multicore Processors," 16th International Conference on Parallel Architecture and Compilation Techniques, 2007.

Zhang, X. et al., "An Evaluation of Per-Chip Nonuniform Frequency Scaling on Multicores," Proceedings of the 2010 USENIX Conference on USENIX Annual Technical Conference (USENIXATC'10), 2010.

\* cited by examiner

QUALITY OF SERVICE TARGETS IN MULTICORE PROCESSORS

CROSS-REFERENCE TO RELATED APPLICATION

The present application is a national stage filing under 35 U.S.C. §371 of PCT Application No. PCT/US2012/023636, filed on Feb. 2, 2012.

BACKGROUND

Unless otherwise indicated herein, the materials described in this section are not prior art to the claims in this application and are not admitted to be prior art by inclusion in this section.

Some ubiquitous computing ("ubicomp") devices utilize batteries as an energy source. As ubicomp devices become more pervasive, the demand for computational power in the ubicomp devices may increase, thereby also increasing energy consumption. The corresponding energy consumption resulting from the increased demand for computational power is projected to outpace the growth of energy capacity in batteries. As a result, efficient energy utilization may become increasingly important for ubicomp devices and other devices that have increasing energy demands, but operate under energy constraints.

SUMMARY

The present disclosure generally describes techniques for adapting a processor core on a multicore processor of a computer to achieve a quality of service target. Some example methods may include identifying a target level of a resource on the computer. Example methods may include identifying a first utilization value of the resource when the processor core is configured to operate at a first frequency. Example methods may include identifying a second utilization value of the resource when the processor core is configured to operate at a second frequency. Example methods may include generating a linear interpolation between a first point and a second point. The first point may have first coordinates including the first frequency and the first utilization value. The second point may have second coordinates including the second frequency and the second utilization value. Example methods may also include identifying an intersection point somewhere between the linear interpolation and the target level. The intersection point may have intersection coordinates including a third frequency and the target level. Example methods may further include setting the processor core to operate at the third frequency identified in the intersection point.

Some other example methods may include identifying a first target level of a first resource on the computer. Example methods may include identifying a second target level of a second resource on the computer. Example methods may include identifying a first utilization value of the first resource when the processor core is configured to operate at a first frequency. Example methods may include identifying a second utilization value of the first resource when the processor core is configured to operate at a second frequency. Example methods may include identifying a third utilization value of the second resource when the processor core is configured to operate at the first frequency. Example methods may include identifying a fourth utilization value of the second resource when the processor core is configured to operate at the second frequency.

Example methods may include generating a first linear interpolation between the first point and the second point. The first point may have first coordinates including the first frequency and the first utilization value. The second point may have second coordinates including second frequency and the second utilization value. Example methods may include identifying a first intersection point between the first linear interpolation and the first target level. The first intersection point may have first intersection coordinates including a first candidate frequency and the first target level. Example methods may include generating a second linear interpolation between a third point and a fourth point. The third point may have third coordinates including the first frequency and the third utilization value. The fourth point may have fourth coordinates including the second frequency and the fourth utilization value.

Example methods may include identifying a second intersection point between the second linear interpolation and the second target level. The second intersection point may have second intersection coordinates including a second candidate frequency and the second target level. Example methods may also include determining a third frequency by selecting a minimum between the first candidate frequency and the second candidate frequency. Example methods may further include setting the processor core to operate at the third frequency upon determining the third frequency.

The present disclosure generally describes some multicore processors. The multicore processors may each include multiple processor cores including a processor core and another processor core, a cache memory shared by the multiple processor cores, an off-chip memory coupled to the multiple processor cores, and a frequency setting module coupled to the multiple processor cores. Some example frequency setting modules may identify a first target level. The first target level may be associated with an off-chip memory bandwidth connecting the multicore processor with the off-chip memory. Example frequency setting modules may identify a second target level. The second target level may be associated with a utilization of the cache memory.

Example frequency setting modules may identify a first utilization value of the off-chip memory bandwidth. The first utilization value may be associated with a first amount of the off-chip memory bandwidth that is utilized when the processor core is configured to operate at a first frequency. Example frequency setting modules may identify a second utilization value of the off-chip memory bandwidth. The second utilization value may be associated with a second amount of the off-chip memory bandwidth that is utilized when the processor core is configured to operate at a second frequency. Example frequency setting modules may identify a third utilization value of the cache memory. The third utilization value may be associated with a first amount of the cache memory that is utilized when the processor core is configured to operate at the first frequency. Example frequency setting modules may identify a fourth utilization value of the cache memory. The fourth utilization value may be associated with a second amount of the cache memory that is utilized when the processor core is configured to operate at the second frequency.

Example frequency setting modules may generate a first linear interpolation between a first point and a second point. The first point may have first coordinates including the first frequency and the first utilization value. The second point may have second coordinates including second frequency and the second utilization value. Example frequency setting modules may identify a first intersection point between the first linear interpolation and the first target level. The first intersection point may have first intersection coordinates including a first candidate frequency and the first target level. Example frequency setting modules may generate a second linear interpolation between a third point and a fourth point. The third point may have third coordinates including the first frequency and the third utilization value. The fourth point may have fourth coordinates including the second frequency and the fourth utilization value. Example frequency setting modules may identify a second intersection point between the second linear interpolation and the second target level. The second intersection point may have second intersection coordinates including a second candidate frequency and the second target level. Example frequency setting modules may also determine a third frequency by selecting a minimum between the first candidate frequency and the second candidate frequency. Example frequency setting modules may further set the processor core to operate at the third frequency when the third frequency is determined.

The foregoing Summary is illustrative only and is not intended to be in any way limiting. In addition to the illustrative aspects, embodiments, and features described above, further aspects, embodiments, and features will become apparent by reference to the Figures and the following Detailed Description.

DESCRIPTION OF THE FIGURES

The foregoing and other features of this disclosure will become more fully apparent from the following Detailed Description, accompanying Figures, and appended claims. Understanding that these Figures depict only several embodiments in accordance with the disclosure and are, therefore, not to be considered limiting of its scope, the disclosure will be described with additional specificity and detail with reference to the accompanying Figures, in which:

DETAILED DESCRIPTION

Figure 1:
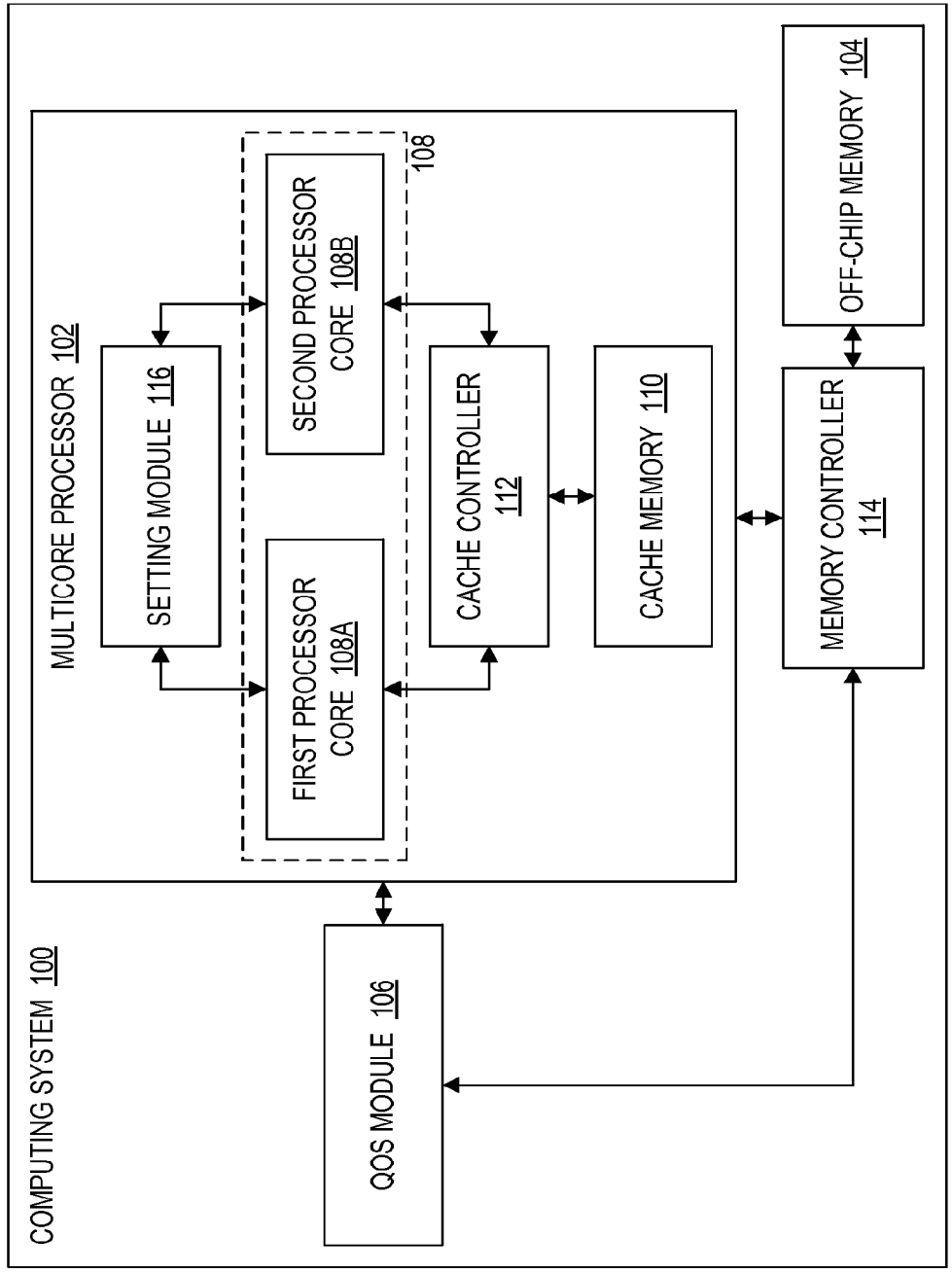
FIG. 1 is a functional block diagram illustrating a computing system adapted to implement step-wise search or a quick search technique.

In the present Detailed Description, reference is made to the accompanying Figures, which form a part hereof. In the Figures, similar symbols typically identify similar components, unless context dictates otherwise. The illustrative embodiments described in the Detailed Description and Figures are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

An owner or operator of a multicore chip may dedicate different processor cores to different users or virtual machines. In this way, each user can run its own applications on its dedicated processor cores. The owner can dedicate only those processor cores that each user will utilize. By dividing the processing power to multiple users in this manner, the owner can increase utilization of the multicore chip. Although each user may have its own dedicated processor cores, the users may share certain computing resources (referred to herein as shared computing resources) of the multicore chip. Some examples of shared computing resources may include power (e.g., the cores in a multicore chip may share a limited amount of power provided by an external power supply), cache memory capacity, main memory capacity, and/or off-chip memory bandwidth.

In some implementations, a cloud computing service provider may deliver shared computing resources of a server computer to multiple customers. Different customers may each have a different allocation of shared computing resources depending on a service level agreement ("SLA") associated with each customer. For example, one customer may pay a premium to the service provider in order to have a higher quality of service than another customer who does not pay the premium. Each customer may utilize its respective allocation of shared computing resources to run various applications on the server computer. In some other implementations, an enterprise may deliver shared computing resources of the server computer to multiple employees of the enterprise or other users. The server computer may contain one or more multicore chips.

If the server computer does not enforce the allocations, an application operated by a first customer with a lower allocation may dominate the shared computing resources over another application operated by a second customer with a higher allocation. Such domination may violate the SLA of the second customer. In order to enforce the allocations, the owner may partition the shared computing resources, including some amount of cache memory and some amount of off-chip memory bandwidth to each customer. However, the ideal allocations between the cache memory and the off-chip memory bandwidth may not be clear.

For example, a processor core may be configured to operate at a default voltage and frequency level, which in some cases is the highest voltage and frequency level of the processor. The processor core operating at the highest voltage and frequency level may generate memory requests at a high rate. A bottleneck can occur if the partitioned cache memory and/or the partitioned off-chip memory bandwidth are inadequate given the high rate of memory requests. If the partitioned cache memory is inadequate, then the partitioned cache memory may incur an excessive number of cache misses and/or incur a high off-chip bandwidth utilization rate. If the partitioned off-chip memory bandwidth is inadequate, then the processor core may incur significant delays while fetching the requested data from the main memory due to queuing delay. While the processor core is stalled waiting for the requested data, the processor core may waste significant energy while operating in the highest voltage and frequency level.

Thus, the partitioned cache memory and the partitioned off-chip memory bandwidth may effectively impose a quota that arbitrarily restricts the speed at which the processor core can execute instructions. That is, even though the processor core may be configured to operate at higher speeds, the processor can only operate as fast as the partitioned cache memory and the partitioned off-chip memory bandwidth allow.

This disclosure is generally drawn, inter alia, to a multicore chip adapted to modify a voltage and frequency level of a processor core such that the processor core operates at the voltage and frequency level that matches the quota imposed by the partitioning of shared computing resources. The multicore chip may be coupled to a setting module. The setting module may be configured to adjust the voltage and frequency level of the processor core. For example, a processor core operating at the highest voltage and frequency level may cause an excessive number of cache misses in a partitioned cache memory and excessive utilization of a partitioned off-chip bandwidth. By lowering the voltage and frequency level to a more optimal setting, the processor core may naturally incur fewer cache misses and a lower utilization of the partitioned off-chip bandwidth. Partitioning may also be removed if the lower voltage and frequency level reduces utilization below the quota. The processor core may also save significant energy by operating at the lower voltage and frequency level.

FIG. 1 is a functional block diagram illustrating a computing system 100 adapted to implement step-wise search and/or a quick search technique, arranged in accordance with at least some embodiments presented herein. The computing system 100 may include a multicore processor 102 coupled to an off-chip memory 104 and a quality of service ("QOS") module 106. The multicore processor 102 may include a first processor core 108A and a second processor core 108B. The processor cores 108A-108B may be collectively referred to as processor cores 108. The processor cores 108 may share a cache memory 110. A cache controller 112 may be configured to manage access to the cache memory 110 by the processor cores 108. The processor cores 108 may also share the off-chip memory 104, which may also be referred to as the main memory of the computing system 100. A memory controller 114 may be configured to manage access to the off-chip memory 104 by the processor cores 108. The memory controller 114 may be located in or outside of multicore processor 102.

The QOS module 106 may be configured to manage allocations of shared computing resources, such as capacity in the cache memory 110 or bandwidth for accessing the off-chip memory 104. For example, a first user may be assigned the first processor core 108A, and a second user may be assigned the second processor core 108B. A first SLA associated with the first user may specify that the first user is allocated with a first target capacity of the cache memory 110 and a first target bandwidth for accessing the off-chip memory 104. A second SLA associated with the second user may specify that the second user is allocated with a second target capacity of the cache memory 110 and a second target bandwidth for accessing the off-chip memory 104.

Here, the QOS module 106 may be configured to communicate with the cache controller 112 to ensure that when the first processor core 108A accesses the cache memory 110, the first processor core 108A does not utilize more capacity than the first target capacity, in accordance with the first SLA. The QOS module 106 may also be configured to communicate with the memory controller 114 to ensure that when the first processor core 108A accesses the off-chip memory 104, the first processor core 108A does not utilize more bandwidth than the first target bandwidth, in accordance with the first SLA. Similarly, the QOS module 106 may be configured to communicate with the cache controller 112 to ensure that when the second processor core 108B accesses the cache memory 110, the second processor core 108B does not utilize more capacity than the second target capacity, in accordance with the second SLA. The QOS module 106 may also be configured to communicate with the memory controller 114 to ensure that when the second processor core 108B accesses the off-chip memory 104, the second processor core 108B does not utilize more bandwidth than the second target bandwidth, in accordance with the second SLA.

Each of the processor cores 108 may be configured to operate at a distinct default voltage and frequency level. In some cases, the default voltage and frequency level may be the highest voltage and frequency level at which each of the processor cores 108 can operate. According to some embodiments, any one of the processor cores 108 may be designed to operate in one of multiple voltage states (e.g., state one through state twenty). Each voltage state may include a single frequency or a range of frequencies in which each of the processor cores 108 can be configured to operate. Frequencies may or may not overlap between voltage states. For example, the first processor core 108A may be configured to operate, by default, in voltage state twenty, which is the highest voltage state at which the first processor core 108A can operate. In particular, the first processor core 108A may be configured to operate at the highest frequency within a range of frequencies within the voltage state twenty. The first processor core 108A may be configured to operate at a lower frequency within this range of frequencies while operating in the voltage state twenty. However, in order to operate at an even lower frequency below this range of frequencies, the first processor core 108A may be set to another voltage state that supports the even lower frequency. For purposes of simplicity, some examples described herein may refer to a single frequency associated with each voltage state, although each voltage state may be associated with a range of frequencies in other implementations.

The multicore processor 102 may further include a setting module 116. The setting module 116 may be part of the multicore processor 102 or external to the multicore processor 102. The setting module 116 may be configured to set each processor core in the processor cores 108 to operate at a particular voltage state that corresponds to a desired frequency. When the processor core operates at the desired frequency, the processor core may utilize an amount of a shared computing resource (e.g., cache capacity, off-chip memory bandwidth, etc.) that meets a target level of the shared computing resource. The processor core may initially be configured to operate at a default frequency corresponding to a default voltage state. For example, if the default voltage state is the highest voltage state at which the processor core can operate, then the default frequency may be the highest frequency. The highest frequency may be higher than the desired frequency. In this case, the setting module 116 may be configured to transition the processor core from the highest frequency to the desired frequency, for example by setting the processor core to one of the lower voltage states. It should be appreciated that lowering voltage is not the only way to lower frequency. Lowering frequency and voltage may result in lower dynamic power consumption, while lowering frequency but not voltage may not lower dynamic power consumption as much. However, lowering voltage may increase transition latency.

The relationship between the frequency of the processor core and the amount of the shared computing resource that processor core utilizes while operating at that frequency may not be predictable. That is, the amount of the shared computing resource that processor core utilizes while operating at various frequencies may not follow a predefined function, such as a linear function. The relationship may also differ depending on the application executed by the processor core. Further, the relationship may even differ depending on the particular execution phase of a given application. Because the relationship between the frequency of the processor core and the amount of the shared computing resource that processor core utilizes while operating at that frequency may not be predictable, the setting module 116 may or may not be able to easily determine the value of the desired frequency at which the processor core utilizes the shared computing resource at the target level.

In some embodiments, a target level may be specified in a SLA corresponding to a user assigned to the processor core. In some other embodiments, the target level may also be computed based on some condition specified in the SLA. For example, the SLA may specify that the user is guaranteed at least a minimum response time. Here, the processor core may utilize some amount of the shared computing resource in order to ensure the minimum response time. This amount of the shared computing resource may be the target level of the shared computing resource.

According to some embodiments, the setting module 116 may be configured to implement a step-wise search in order to determine the value of the desired frequency. In the step-wise search, the setting module 116 may be configured to transition the processor core to a next lower voltage state (and correspondingly, a next lower frequency) until the processor core operates at the desired frequency in which the amount of the shared computing resource that the processor core utilizes while operating at the desired frequency meets the target level. The processor core may be configured to operate initially in the default voltage state, which can correspond to a first frequency. The setting module 116 may be configured to identify a first amount of the shared computing resource utilized by the processor core when the processor core operates at the first frequency.

The setting module 116 may be configured to identify an amount of the shared computing resource utilized by the processor core by receiving the amount from hardware, software, or firmware associated with the shared computing resource. In one example, the setting module 116 may be configured to query the cache controller 112 in order to identify the amount of the cache memory 110 utilized by the processor cores 108. In another example, the setting module 116 may be configured to query the memory controller 114 in order to identify the amount of bandwidth utilized by the processor cores 108 for accessing the off-chip memory 104.

When the setting module 116 identifies the first amount of the shared computing resource utilized by the processor core when the processor core operates in the default voltage/frequency state, the setting module 116 may be configured to determine whether the first amount meets the target level of the shared computing resource. If the first amount meets the target level of the shared computing resource, then the first frequency is the desired frequency. If the first amount does not meet the target level of the shared computing resource, then the setting module 116 may be configured to set the processor core from the default voltage state to the next lower voltage/frequency state, which can correspond to a second frequency.

When the setting module 116 identifies the second amount of the shared computing resource utilized by the processor core when the processor core operates in the next lower voltage state, the setting module 116 may be configured to identify a second amount of the shared computing resource utilized by the processor core when the processor core operates at the second frequency. The setting module 116 may be configured to determine whether the second amount meets the target level of the shared computing resource. If the second amount meets the target level of the shared computing resource, then the second frequency is the desired frequency.

If the second amount does not meet the target level of the shared computing resource, then the setting module 116 may be configured to repeat the above step-wise search of (a) setting the processor core from the current voltage state to the next lower voltage state corresponding to a new frequency and (b) identifying a new amount of the shared computing resource utilized by the processor core when the processor core operates at the new frequency. This step-wise search may be repeated until the desired frequency has been found (i.e., when the new amount of the shared computing resource meets the target level of the shared computing resource). While the step-wise search eventually converges to the desired frequency, under the step-wise search the setting module 116 may set the processor core to multiple voltage states until the proper voltage state corresponding to the desired frequency has been found.

According to some other embodiments, the setting module 116 may be configured to implement a quick search technique in order to determine the value of the desired frequency. In contrast to the step-wide search, the quick search technique may more quickly converge to the desired frequency without having to set the processor core to each successive lower voltage state. The processor core may initially be configured to operate at the default voltage state, which can correspond to a first frequency. The setting module 116 may be configured to identify a first amount of the shared computing resource utilized by the processor core when the processor core operates at the first frequency. The setting module 116 may be configured to set the processor core from the default voltage state to the next lower voltage state or some other lower voltage state, which can correspond to a second frequency. The setting module 116 may be configured to identify a second amount of the shared computing resource utilized by the processor core when the processor core operates at the second frequency.

The first frequency and the first amount of the shared computing resource may form coordinates of a first point. The second frequency and the second amount of the shared computing resource may form coordinates of a second point. The setting module 116 may be configured to generate a first linear interpolation through (or between) the second point and the first point. The setting module 116 may be configured to identify a first candidate point where the first linear interpolation meets the target level of the shared computing resource. The coordinates of the first candidate point may include a first candidate frequency and the target level of the shared computing resource.

The setting module 116 may be configured to set the processor core to operate at a first candidate voltage state corresponding to the first candidate frequency. The setting module 116 may be configured to identify a third amount of the shared computing resource utilized by the processor core when the processor core operates at the first candidate frequency. The first candidate frequency and the third amount of the shared computing resource may form coordinates of a third point. The setting module 116 may be configured to determine whether the third amount matches the second amount of the shared computing resource. If the third amount matches the second amount, then the first candidate frequency is the desired frequency because the quick search has converged to the desired frequency.

Because the relationship between the frequency of the processor core and the amount of the shared computing resource that processor core utilizes while operating at that frequency may not be linear, the first candidate frequency may not be the desired frequency. If the third amount does not match the second amount, then the setting module 116 may be configured to generate a second linear interpolation through the third point and the second point. The setting module 116 may be configured to identify a second candidate point where the second linear interpolation meets the target level of the shared computing resource. The coordinates of the second candidate point may include a second candidate frequency and the target level of the shared computing resource.

The setting module 116 may be configured to set the processor core to operate at a second candidate voltage state corresponding to the second candidate frequency. The setting module 116 may be configured to identify a fourth amount of the shared computing resource utilized by the processor core when the processor core operates at the second candidate frequency. The second candidate frequency and the fourth amount of the shared computing resource may form coordinates of a fourth point. The setting module 116 may be configured to determine whether the fourth amount matches the third amount of the shared computing resource. If the fourth amount matches the third amount, then the second candidate frequency is the desired frequency because the quick search has converged to the desired frequency.

If the fourth amount does not match the third amount, then the setting module 116 may be configured to repeat the above quick search technique of (a) generating a linear interpolation through the new point (e.g., the fourth point) and the previous point (e.g., the third point), (b) identifying a candidate point where the linear interpolation meets the target level of the shared computing resource, where the coordinates of the candidate point include a candidate frequency and the target level of the shared computing resource, (c) setting the processor core to operate at a candidate voltage state corresponding to the candidate frequency, and (d) identifying an amount of the shared computing resource utilized by the processor core when the processor core operates at the candidate frequency, where candidate frequency and the amount of the shared computing resource may form coordinates of a new point. This quick search technique may be repeated until the candidate frequencies begin repeating. The repetition of candidate frequencies may indicate that the quick search has converged to the desired frequency.

Figure 2:
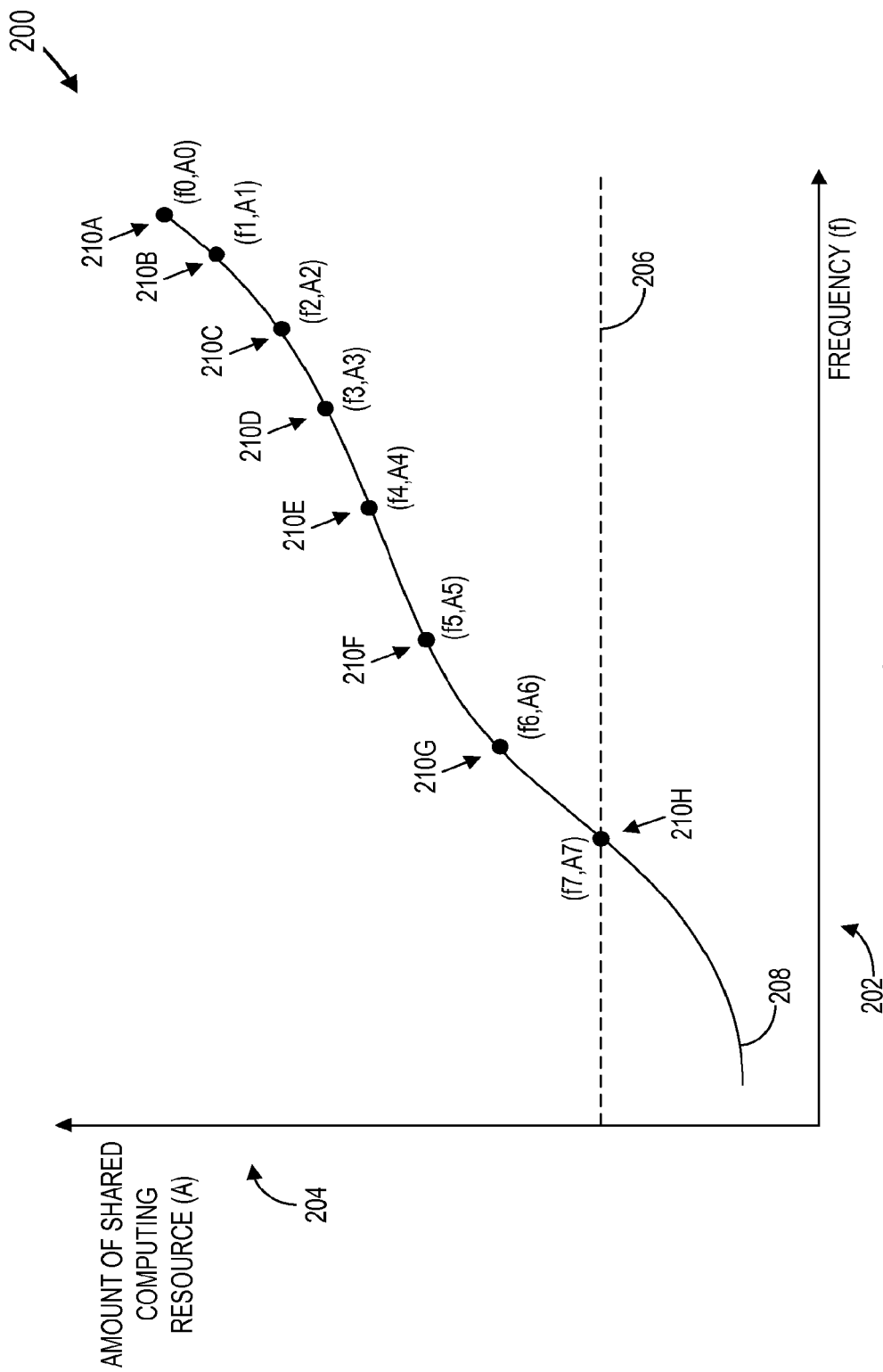
FIG. 2 is a line chart illustrating an example implementation of the step-wise search.

FIG. 2 is a line chart 200 illustrating an example implementation of the step-wise search, arranged in accordance with at least some embodiments presented herein. The line chart 200 may include an x-axis 202 and a y-axis 204. The x-axis 202 may correspond to a frequency of a processor core and the y-axis 204 may correspond to an amount of a shared computing resource utilized by the processor core when operating at that frequency. A target line 206 may represent a target level of the shared computing resource. The line chart 200 may also include a relationship line 208 that represents a relationship between the frequency of the processor core and the amount of the shared computing resource utilized by the processor core when operating at that frequency. The relationship line 208 may not be known and may not correspond to a known function.

Under the step-wise search, the setting module 116 may be configured to operate initially in the default voltage state, which can correspond to a first frequency (f0). The setting module 116 may be configured to identify a first amount (A0) of the shared computing resource utilized by the processor core when the processor core operates at the first frequency (f0). The first frequency (f0) and the first amount (A0) may form the coordinates of a first point 210A along the relationship line 208.

The setting module 116 may be configured to determine whether the first amount (A0) meets the target level of the shared computing resource. As illustrated in the line chart 200, the first point 210A does not meet the target line 206. Thus, the first amount (A0) does not meet the target level of the shared computing resource. The setting module 116 may be configured to transition the processor core to a next lower voltage state (and correspondingly, a next lower frequency) until the processor core operates at the desired frequency in which the amount of the shared computing resource that the processor core utilizes while operating at the desired frequency meets the target level. In the example illustrated in FIG. 2, the processor core may be configured to operate in multiple voltage states that correspond to at least the first frequency (f0), a second frequency (f1), a third frequency (f2), a fourth frequency (f3), a fifth frequency (f4), a sixth frequency (f5), a seventh frequency (f6), and an eighth frequency (f7).

The setting module 116 may be configured to repeat the step-wise search through the second frequency (f1) as illustrated in a second point 210B, the third frequency (f2) as illustrated in a third point 210C, the fourth frequency (f3) as illustrated in a fourth point 210D, the fifth frequency (f4) as illustrated in a fifth point 210E, the sixth frequency (f5) as illustrated in a sixth point 210F, the seventh frequency (f6) as illustrated in a seventh point 210G, and the eighth frequency (f7) as illustrated in an eighth point 210H. The second frequency (f1) may correspond to a second amount (A1). The third frequency (f2) may correspond to a third amount (A2). The fourth frequency (f3) may correspond to a fourth amount (A3). The fifth frequency (f4) may correspond to a fifth amount (A4). The sixth frequency (f5) may correspond to a sixth amount (A5). The seventh frequency (f6) may correspond to a seventh amount (A6). The second amount (A1), the third amount (A2), the fourth amount (A3), the fifth amount (A4), the sixth amount (A5), and the seventh amount (A6) may each not meet the target level of the shared computing resource.

The eighth frequency (f7) may correspond to an eighth amount (A7), which meets the target level of the shared computing resource. Thus, the eighth frequency (f7) is the desired frequency. While the step-wise search eventually converges to the desired frequency, under the step-wise search the setting module 116 may set the processor core to multiple voltage states until the proper voltage state corresponding to the desired frequency has been found. In the example illustrated in FIG. 2, the setting module 116 may set the processor core seven times (i.e., the second frequency (f1) to the eighth frequency (f7)). As previously described, each transition to another voltage state can incur significant overhead.

Figure 3:
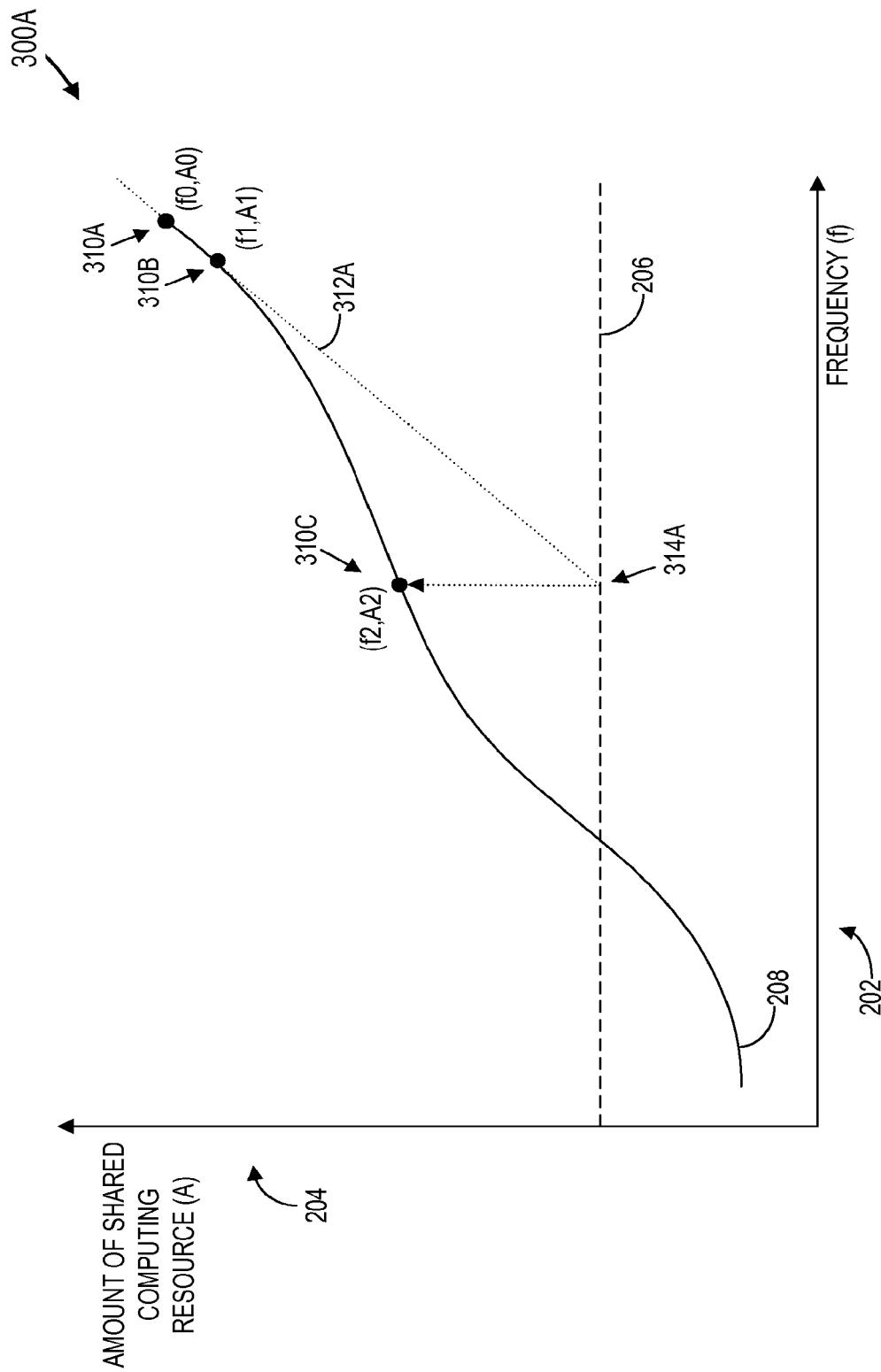
FIGS. 3-5 are line charts illustrating an example implementation of the quick search technique.
Figure 4:
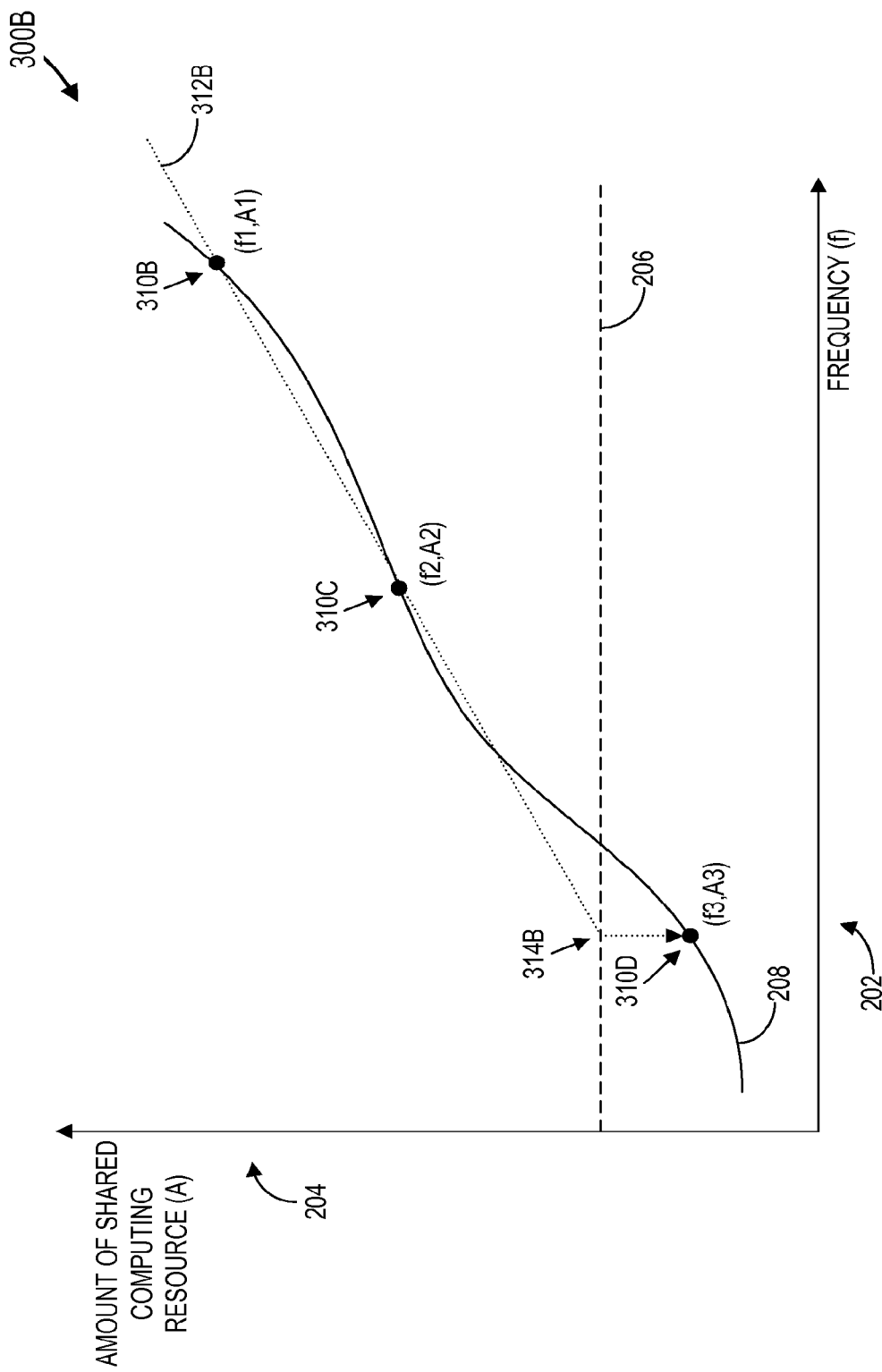
Figure 5:
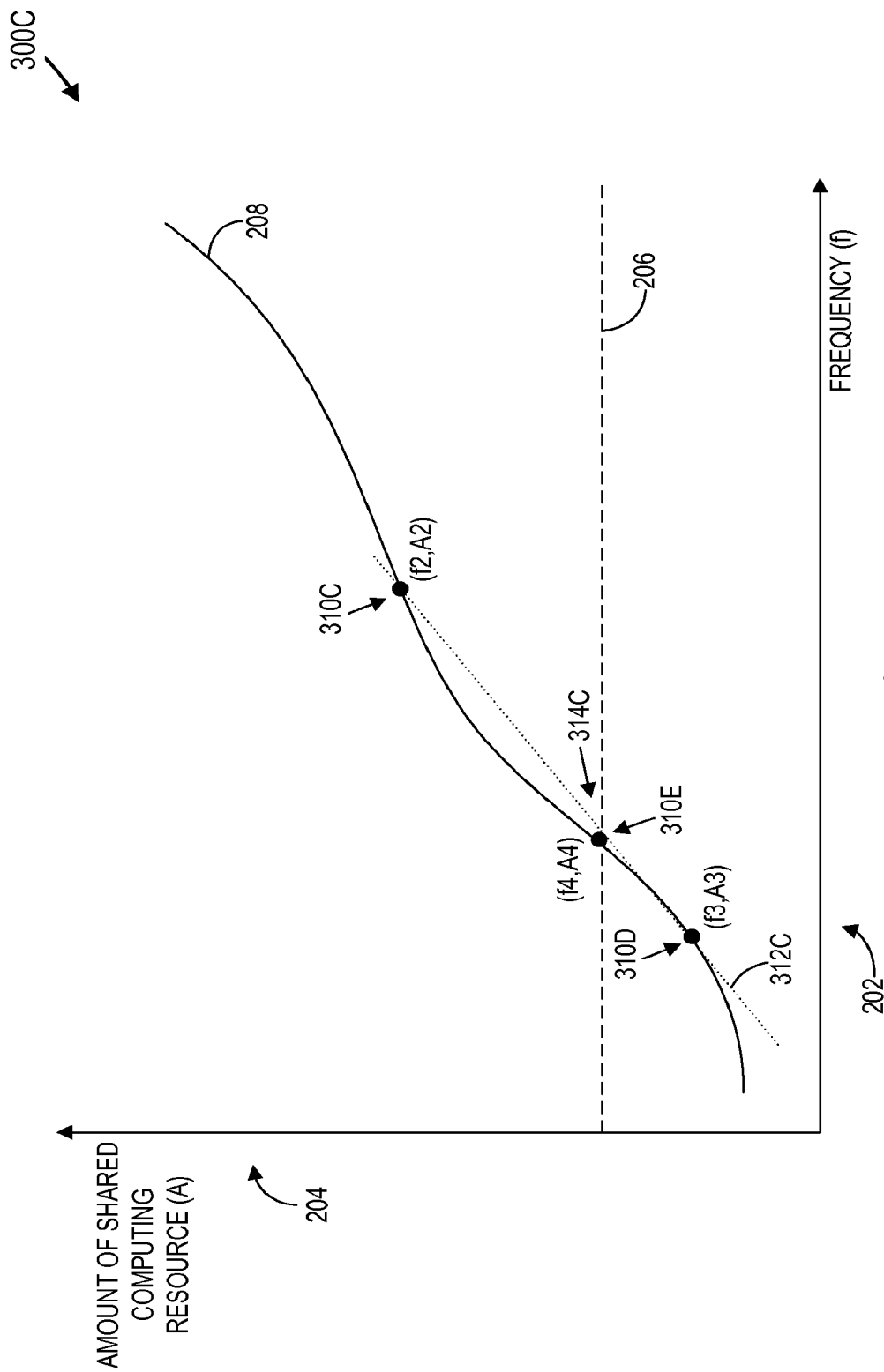

FIGS. 3-5 are line charts 300A-300C illustrating an example implementation of the quick search technique, arranged in accordance with at least some embodiments presented herein. The line charts 300A-300C may each include the x-axis 202, the y-axis 204, the target line 206, and the relationship line 208, as also illustrated in the line chart 200.

Under the quick search technique, the processor core may initially be configured to operate at the default voltage state, which can correspond to a first frequency (f0). The setting module 116 may be configured to identify a first amount (A0) of the shared computing resource utilized by the processor core when the processor core operates at the first frequency (f0). The setting module 116 may be configured to set the processor core from the default voltage state to the next lower voltage state or some other lower voltage state, which can correspond to a second frequency (f1). The setting module 116 may be configured to identify a second amount (A1) of the shared computing resource utilized by the processor core when the processor core operates at the second frequency (f1).

The first frequency (f0) and the first amount (A0) may form the coordinates of a first point 310A along the relationship line 208. The second frequency (f1) and the second amount (A1) may form coordinates of a second point 310B along the relationship line 208. The setting module 116 may be configured to generate a first linear interpolation 312A through the second point 310B and the first point 310A, as illustrated in FIG. 3. The setting module 116 may be configured to identify a first candidate point 314A where the first linear interpolation 312A meets the target level of the shared computing resource, as indicated by the target line 206. The coordinates of the first candidate point 314A may include a first candidate frequency (f2) and the target level of the shared computing resource.

The setting module 116 may be configured to set the processor core to operate at a first candidate voltage state corresponding to the first candidate frequency (f2). The setting module 116 may be configured to identify a third amount (A2) of the shared computing resource utilized by the processor core when the processor core operates at the first candidate frequency (f2). The first candidate frequency (f2) and the third amount (A2) may form coordinates of a third point 310C. The setting module 116 may be configured to determine whether the third amount (A2) matches the second amount (A1).

In this case, the setting module 116 may determine that the third amount (A2) does not match the second amount (A1). As a result, the setting module 116 may be configured to generate a second linear interpolation 312B through the third point 310C and the second point 310B, as illustrated in FIG. 4. The setting module 116 may be configured to identify a second candidate point 314B where the second linear interpolation 312B meets the target level of the shared computing resource, as indicated by the target line 206. The coordinates of the second candidate point 314B may include a second candidate frequency (f3) and the target level of the shared computing resource.

The setting module 116 may be configured to set the processor core to operate at a second candidate voltage state corresponding to the second candidate frequency (f3). The setting module 116 may be configured to identify a fourth amount (A3) of the shared computing resource utilized by the processor core when the processor core operates at the second candidate frequency (f3). The second candidate frequency (f3) and the fourth amount (A3) may form coordinates of a fourth point 310D. The setting module 116 may be configured to determine whether the fourth amount (A3) matches the third amount (A2).

In this case, the setting module 116 may determine that the fourth amount (A3) does not match the third amount (A2). As a result, the setting module 116 may be configured to generate a third linear interpolation 312C through the fourth point 310D and the third point 310C, as illustrated in FIG. 5. The setting module 116 may be configured to identify a third candidate point 314C where the third linear interpolation 312C meets the target level of the shared computing resource, as indicated by the target line 206. The coordinates of the third candidate point 314C may include a third candidate frequency (f4) and the target level of the shared computing resource.

The setting module 116 may be configured to set the processor core to operate at a third candidate voltage state corresponding to the third candidate frequency (f4). The setting module 116 may be configured to identify a fifth amount (A4) of the shared computing resource utilized by the processor core when the processor core operates at the third candidate frequency (f4). The third candidate frequency (f4) and the fifth amount (A4) may form coordinates of a fifth point 310E. The setting module 116 may be configured to determine whether the fifth amount (A4) matches the fourth amount (A3).

In this case, the fifth amount (A4) does not match the fourth amount (A3). However, in additional iterations of the quick search, new amounts corresponding to new candidate points match the fifth amount (A4). Thus, the third candidate frequency (f4) is the desired frequency. Whereas under the stepwise search the setting module 116 set the processor core seven times before converging to the desired frequency, under the quick search technique the setting module 116 sets the processor core only four times before converging to the desired frequency. Thus, the quick search technique can save significant overhead when compared to the step-wise search.

It should be appreciated that while the previous examples describe using the last two points to generate a linear interpolation, it should be appreciated that other combinations of points may be used. For example, the setting module 116 may be configured to take the last N points, generate a linear interpolation with a least square method, and use the linear interpolation to find the intersection point with the target level. The linear interpolation may assign equal weights to all N points, or may assign larger weights to more recent points and smaller weights to less recent points.

Figure 6:
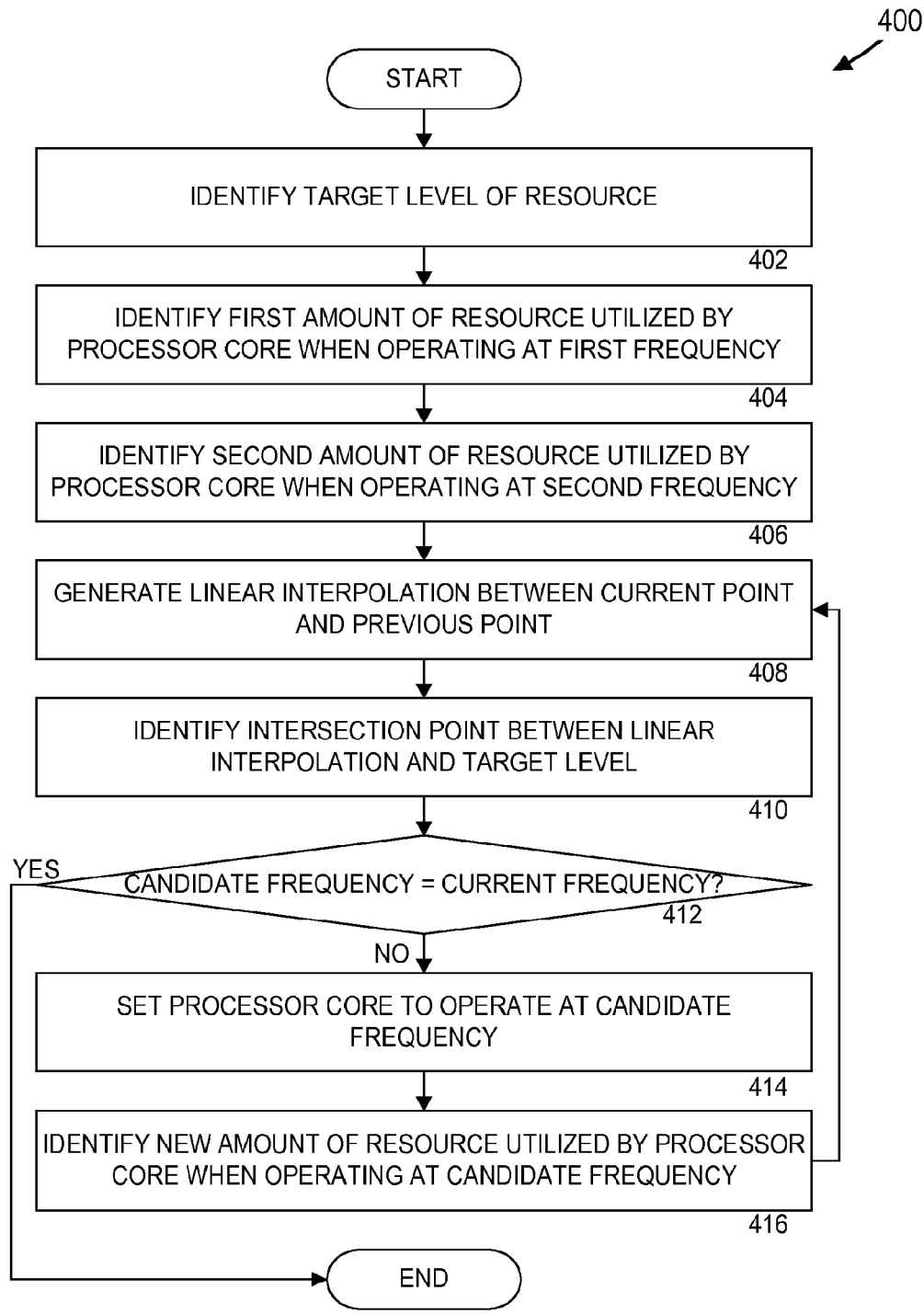
FIG. 6 is a flow diagram illustrating an example process adapted to perform an implementation of the quick search technique.

FIG. 6 is a flow diagram illustrating an example process 400 adapted to perform an implementation of the quick search technique, arranged in accordance with at least some embodiments presented herein. The process 400 may be activated when current utilization amount exceeds the target maximum utilization amount. This implementation of the quick search technique may be utilized to converge to a desired frequency where a single shared computing resource utilized by the processor core is considered. The process 400 may include various operations, functions, or actions as illustrated by one or more blocks 402-416.

The process 400 may begin at block 402 (Identify Target Level of Resource), where the setting module 116 may be configured to identify a target level of a shared computing resource utilized by a processor core in a multicore processor. For example, the target level may be identified in a SLA associated with a user assigned to the processor core. Different processor cores may each be assigned to a different SLA that specifies the amount of the shared computing resource that each processor core may be allowed to utilize. Block 402 may be followed by block 404.

At block 404 (Identify First Amount of Resource Utilized by Processor Core When Operating at First Frequency), the setting module 116 may be configured to identify a first amount of the shared computing resource that is utilized by the processor core when the processor core operates at a first frequency. For example, the first frequency may be the default frequency of the processor core. In some instances, the default frequency may be the highest frequency that the processor core may be designed to operate.

Each frequency at which the processor core can operate may be associated with a voltage state of the processor core. In each voltage state, the processor core may be configured to operate at a single frequency or a range of frequencies. Thus, at least some transitions between frequencies may also include transitions between voltage states. For the sake of simplicity, voltage states may not be explicitly mentioned herein when describing transitions between frequencies. Block 404 may be followed by block 406.

At block 406 (Identify Second Amount of Resource Utilized by Processor Core When Operating at Second Frequency), the setting module 116 may be configured to identify a second amount of the shared computing resource that is utilized by the processor core when operating at the second frequency. In some embodiments, the setting module 116 may determine (or "guess") the second frequency by performing the following computation: $f_1=R_t/R_0*f_0$, where $f_1$ represents the second frequency, $f_0$ represents the first frequency, $R_t$ represents the target level of the shared computing resource, and $R_0$ represents the first amount of shared computing resource.

More generally, the setting module 116 may be configured to determine a resource ratio by dividing the target level of the shared computing resource by the amount of the shared computing resource utilized by the processor core when operating at a previous frequency. The setting module 116 may be configured to determine a current frequency by multiplying the resource ratio and the previous frequency. In a first iteration of the process 400, the current frequency may be the second frequency, and the previous frequency may be the first frequency. Block 406 may be followed by block 408.

At block 408 (Generate Linear Interpolation between Current Point and Previous Point), the setting module 116 may be configured to generate a linear interpolation between a current point and a previous point. The coordinates of the current point may include the current frequency and the amount of the shared computing resource (referred to herein as the current amount) utilized by the processor core when operating at the current frequency. The coordinates of the previous point may include the previous frequency and the amount of the shared computing resource (referred to herein as the previous amount) utilized by the processor core when operating at the previous frequency. In the first iteration of the process 400, the coordinates of the current point may include the second frequency and the second amount of the shared computing resource, and the coordinates of the previous point may include the first frequency and the first amount of the shared computing resource. Block 408 may be followed by block 410.

At block 410, (Identify Intersection Point between Linear Interpolation and Target Level), the setting module 116 may be configured to identifying an intersection point where the linear interpolation meets the target level of the shared computing resource. The coordinates of the intersection point may include a candidate frequency and the target level of the shared computing resource. The candidate frequency may be expressed mathematically as follows:

$$f_{i+1}=f_{i-1}+(R_t-R_{i-1})/(R_i-R_{i-1})*(f_i-f_{i-1})$$

where $f_{i-1}$ represents the previous frequency, $f_i$ represents the current frequency, $R_t$ represents the target level of the shared computing resource, $R_i$ represents the current amount of the shared computing resource, and $R_{i-1}$ represents the previous amount of the shared computing resource utilized by the processor core. Block 410 may be followed by block 412.

At block 412 (Candidate Frequency=Current Frequency?), the setting module 116 may be configured to determine whether the candidate frequency is equal to or approximately equal to the current frequency. If the candidate frequency is equal to or approximately equal to the current frequency, then the process 400 may have converged to the desired frequency. That is, the candidate frequency and the current frequency may represent the desired frequency. Thus, if the new candidate frequency is equal to or approximately equal to the current frequency, then the process 400 either repeat (e.g., periodically, continuously, or on demand as needed) or terminate. If the new candidate frequency does not equal or approximately equal the current frequency, then the process 400 has yet to converge to the desired frequency. Thus, if the new candidate frequency does not equal or approximately equal the current frequency, then block 412 may be followed by block 414.

At block 414 (Set Processor Core to Operate at Candidate Frequency), the setting module 116 may be configured to set the processor core to operate at the candidate frequency. Block 414 may be followed by block 416.

At block 416 (Identify New Amount of Resource Utilized by Processor Core When Operating at Candidate Frequency), the setting module 116 may be configured to identify a new amount of the shared computing resource that is utilized by the processor core when operating at the candidate frequency. The current frequency may be assigned as the new previous frequency, and the candidate frequency may be assigned as the new current frequency. Block 416 may be followed by block 408.

Figure 7:
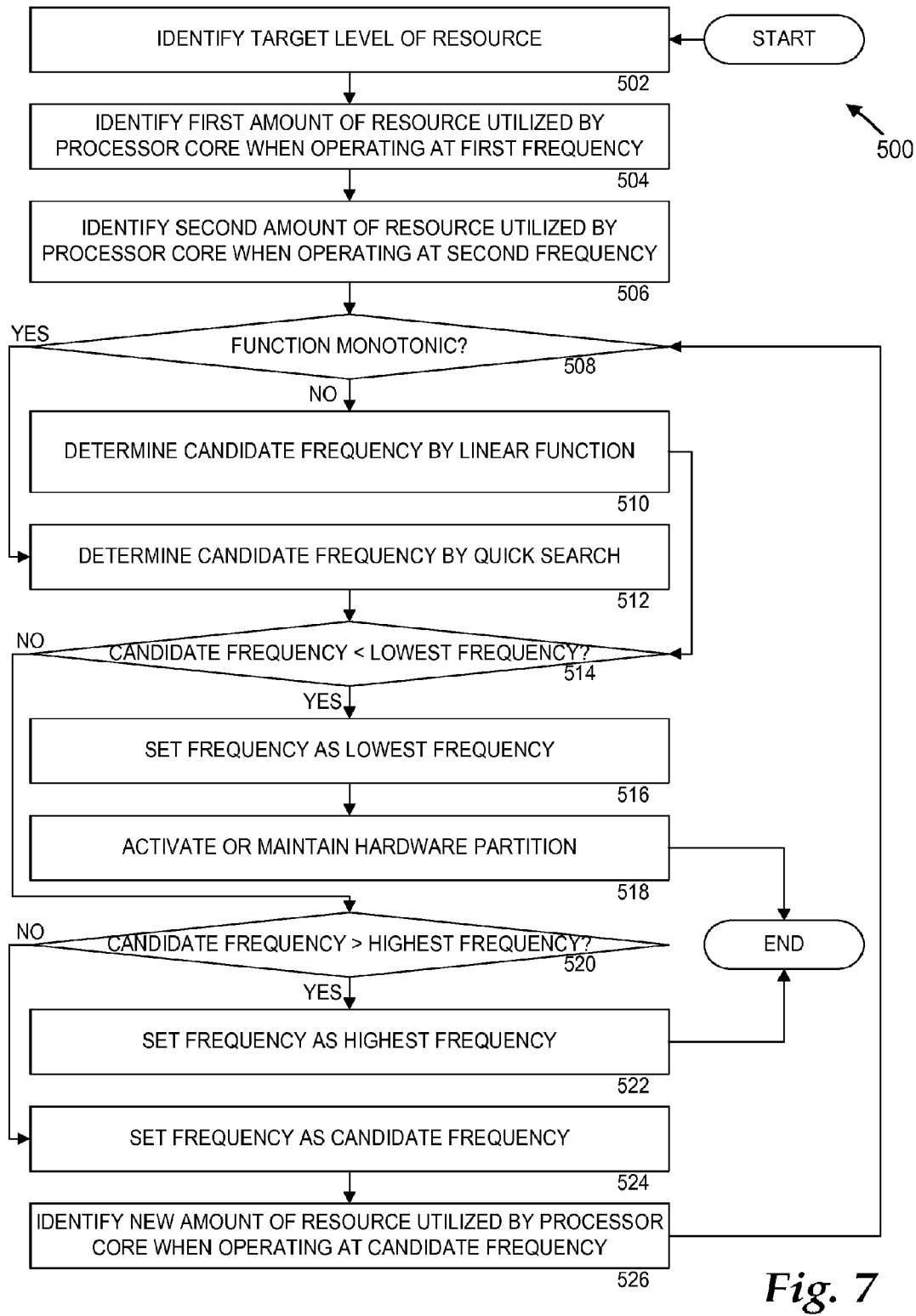
FIG. 7 is a flow diagram illustrating an example process adapted to perform an implementation of the quick search technique.

FIG. 7 is a flow diagram illustrating an example process 500 adapted to perform an implementation of the quick search technique, arranged in accordance with at least some embodiments presented herein. This implementation of the quick search technique may be utilized to converge to a desired frequency where a single shared computing resource utilized by the processor core is considered. The process 500 may include various operations, functions, or actions as illustrated by one or more blocks 502-526.

The process 500 may begin at block 502 (Identify Target Level of Resource), where the setting module 116 may be configured to identify a target level of a shared computing resource utilized by a processor core in a multicore processor. For example, the target level may be identified in a SLA associated with a user assigned to the processor core. Different processor cores may have each be assigned to a different SLA that specifies the maximum amount of the shared computing resource that each processor core may be allowed to utilize. Block 502 may be followed by block 504.

At block 504 (Identify First Amount of Resource Utilized by Processor Core When Operating at First Frequency), the setting module 116 may be configured to identify a first amount of the shared computing resource that is utilized by the processor core when the processor core operates at a first frequency. For example, the first frequency may be the default frequency of the processor core. In some instances, the default frequency may be the highest frequency that the processor core may be designed to operate. Block 504 may be followed by block 506.

At block 506 (Identify Second Amount of Resource Utilized by Processor Core When Operating at Second Frequency), the setting module 116 may be configured to identify a second amount of the shared computing resource that is utilized by the processor core when operating at the second frequency. In some embodiments, the setting module 116 may be configured to determine a resource ratio by dividing the target level of the shared computing resource by the amount of the shared computing resource utilized by the processor core when operating at a previous frequency. The setting module 116 may be configured to determine a current frequency by multiplying the resource ratio and the previous frequency. In a first iteration of the process 500, the current frequency may be the second frequency, and the previous frequency may be the first frequency. Block 506 may be followed by block 508.

At block 508 (Function Monotonic?), the setting module 116 may determine whether the relationship between the current frequency and the current amount of the shared computing resource utilized by the processor core when operating at the current frequency is monotonic. The relationship between the current frequency and the current amount of the shared computing resource may be considered monotonic if the current amount of the shared computing resource decreases as the frequency decreases. Thus, the setting module 116 may be configured to determine whether the current amount of the shared computing resource is greater than or equal to the previous amount of the shared computing resource utilized by the processor core when operating at the previous frequency. The setting module 116 may also be configured to determine whether the current frequency is less than or equal to the previous frequency.

If the current amount of the shared computing resource is greater than or equal to the previous amount of the shared computing resource and the current frequency is less than or equal to the previous frequency, then the setting module 116 may be configured to determine that the relationship between the current frequency and the current amount of the shared computing resource is not monotonic. Otherwise, the setting module 116 may be configured to determine that the relationship between the current frequency and the current amount of the shared computing resource is monotonic. If the relationship between the current frequency and the current amount of the shared computing resource is not monotonic, then block 508 may be followed by block 510. If the relationship between the current frequency and the current amount of the shared computing resource is monotonic, then block 508 may be followed by block 512.

At block 510 (Determine Candidate Frequency by Linear Function), the setting module 116 may be configured to determine a candidate frequency by a linear function. The linear function may be expressed mathematically as follows: $f_{i+1}=R_t/R_i*f_i$, where $f_i$ represents the current frequency, $R_t$ represents the target level of the shared computing resource, and $R_i$ represents the current amount of the shared computing resource. More generally, the setting module 116 may be configured to determine a resource ratio by dividing the target level of the shared computing resource by the current amount of the shared computing resource. The setting module 116 may be configured to determine the candidate frequency by multiplying the resource ratio and the current frequency. Block 510 may be followed by block 514.

At block 512 (Determine Candidate Frequency Quick Search), the setting module 116 may be configured to determine the candidate frequency by quick search. Under the quick search, the setting module 116 may be configured to generate a linear interpolation between a current point and a previous point. The coordinates of the current point may include the current frequency and the current amount of the shared computing resource. The coordinates of the previous point may include the previous frequency and the previous amount of the shared computing resource. The setting module 116 may be configured to identify an intersection point between the linear interpolation and the target level. The coordinates of the intersection point may include the candidate frequency and the target level of the shared computing resource. Block 512 may be followed by block 514.

At block 514 (Candidate Frequency<Lowest Frequency?), the setting module 116 may be configured to determine whether the candidate frequency is less than the lowest frequency at which the processor core can operate. If the candidate frequency is less than the lowest frequency at which the processor core can operate, then block 514 may be followed by block 516. If the candidate frequency is not less than the lowest frequency at which the processor can operate, then block 514 may be followed by block 520.

At block 516 (Set Frequency as Lowest Frequency), the setting module 116 may be configured to set the processor core to operate at the lowest frequency at which the processor core can operate. Block 516 may be followed by block 518.

At block 518 (Activate or Maintain Hardware Partition), the setting module 116 may be configured to activate or maintain a hardware partition adapted to limit utilization of the shared computing resource. For example, the QOS module 106 may be configured to form the hardware partition. The setting module 116 may be configured to communicate with the QOS module 106 to activate and/or deactivate a hardware partition. In some embodiments, the setting module 116 may be configured to instruct the QOS module 106 to deactivate the hardware partition when the process 500 converges to the desired frequency. After block 518, the process 500 either repeat (e.g., periodically, continuously, or on demand as needed) or terminate.

At block 520 (Candidate Frequency>Highest Frequency), the setting module 116 may be configured to determine whether the candidate frequency is greater than the highest frequency at which the processor can operate. If the candidate frequency is greater than the highest frequency at which the processor core can operate, then block 520 may be followed by block 522. If the candidate frequency is not greater than the highest frequency at which the processor core can operate, then block 520 may be followed by block 524.

At block 522 (Set Frequency as Highest Frequency), the setting module 116 may be configured to set the processor core to operate at the highest frequency at which the processor core can operate. After block 522, the process 500 either repeat (e.g., periodically, continuously, or on demand as needed) or terminate.

At block 524 (Set Frequency as Candidate Frequency), the setting module 116 may be configured to set the processor core to operate at the candidate frequency. Block 524 may be followed by block 526.

At block 526 (Identify New Amount of Resource Utilized by Processor Core When Operating at Candidate Frequency), the setting module 116 may be configured to identify a new amount of the shared computing resource that is utilized by the processor core when operating at the candidate frequency. The current frequency may be assigned as the new previous frequency, and the candidate frequency may be assigned as the new current frequency. Block 526 may be followed by block 508.

Figure 8:
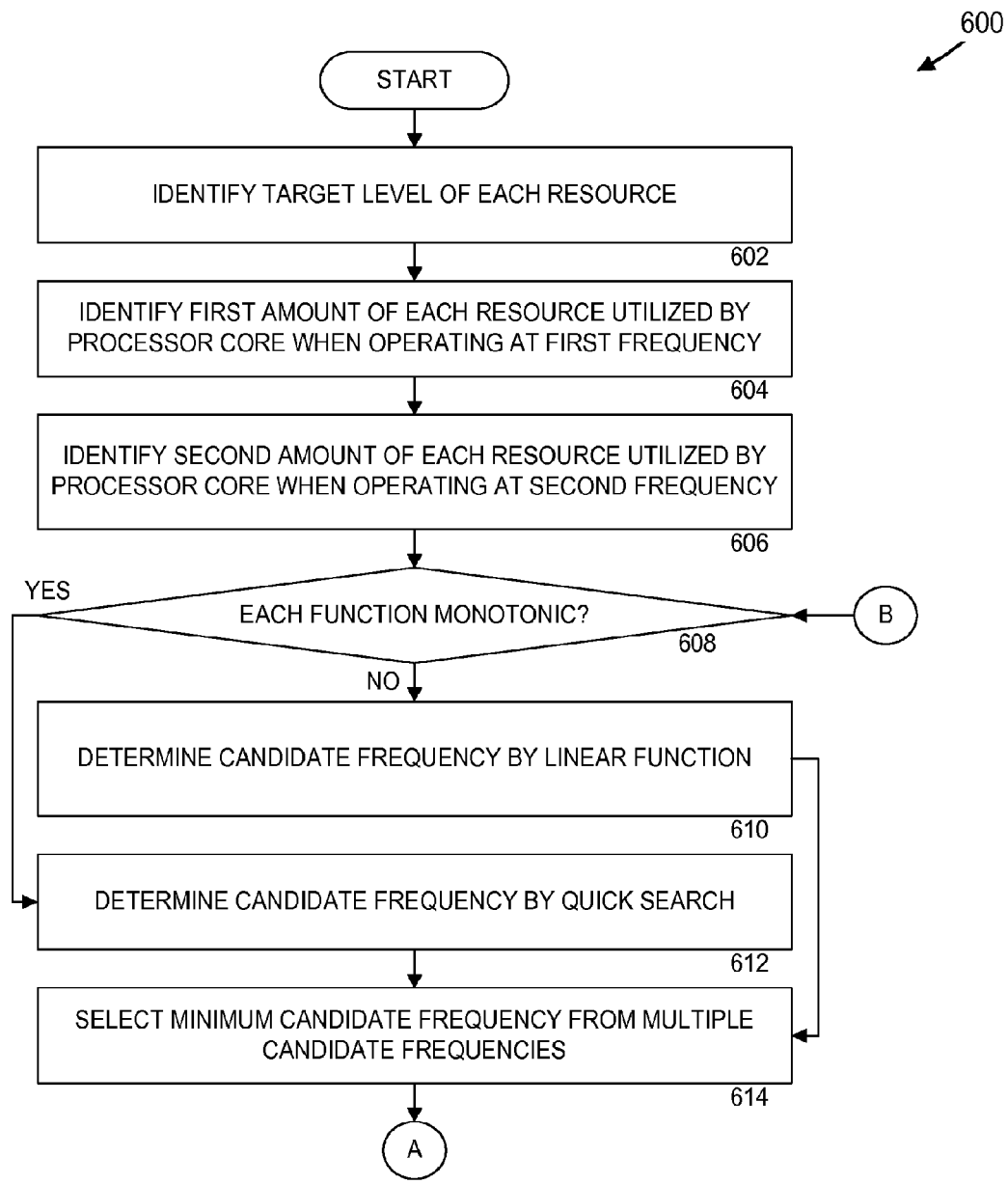
FIGS. 8-9 are flow diagrams illustrating an example process adapted to perform an implementation of the quick search technique.
Figure 9:
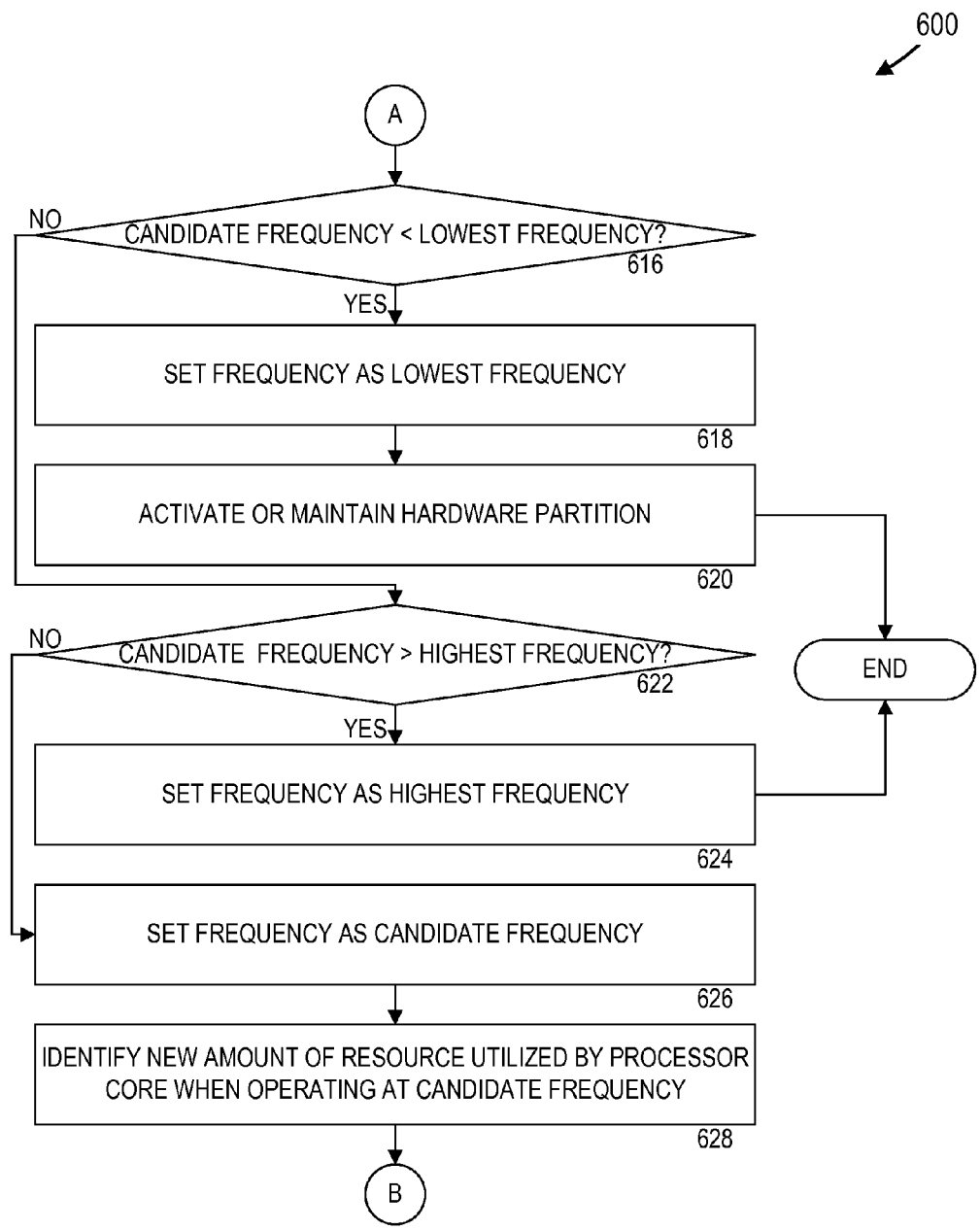

FIGS. 8-9 are flow diagrams illustrating an example process 600 adapted to perform an implementation of the quick search technique, arranged in accordance with at least some embodiments presented herein. This implementation of the quick search technique may be utilized to converge to a desired frequency where two or more shared computing resources utilized by the processor core are considered. The process 600 may include various operations, functions, or actions as illustrated by one or more blocks 602-628.

The process 600 may begin on FIG. 8 at block 602 (Identify Target Level of Each Resource), where the setting module 116 may be configured to identify a target level for each shared computing resource utilized by a processor core in a multicore processor. For example, the target levels may be identified in a SLA associated with a user assigned to the processor core. Different processor cores may have each be assigned to a different SLA that specifies the amount of each shared computing resource that each processor core may be allowed to utilize. Block 602 may be followed by block 604.

At block 604 (Identify First Amount of Each Resource Utilized by Processor Core When Operating at First Frequency), the setting module 116 may be configured to identify a first amount of each shared computing resource that is utilized by the processor core when the processor core operates at a first frequency. For example, the first frequency may be the default frequency of the processor core. In some instances, the default frequency may be the highest frequency that the processor core may be designed to operate. Block 604 may be followed by block 606.

At block 606 (Identify Second Amount of Each Resource Utilized by Processor Core When Operating at Second Frequency), the setting module 116 may be configured to identify a second amount of each shared computing resource that is utilized by the processor core when operating at the second frequency. In some embodiments, the setting module 116 may be configured to determine a resource ratio by dividing the target level of each shared computing resource by the amount of each shared computing resource utilized by the processor core when operating at a previous frequency. The setting module 116 may be configured to determine a current frequency by multiplying the resource ratio and the previous frequency. In a first iteration of the process 500, the current frequency may be the second frequency, and the previous frequency may be the first frequency. Block 606 may be followed by block 608.

At block 608 (Each Function Monotonic?), the setting module 116 may determine whether the relationship between the current frequency and the current amount of each shared computing resource utilized by the processor core when operating at the current frequency is monotonic. The relationship between the current frequency and the current amount of each shared computing resource may be monotonic if the current amount of the shared computing resource decreases if the frequency decreases. Thus, the setting module 116 may be configured to determine whether the current amount of each shared computing resource is greater than or equal to the previous amount of the shared computing resource utilized by the processor core when operating at the higher previous frequency. The setting module 116 may also be configured to determine whether the current amount of each shared computing resource is less than or equal to the previous amount of the shared computing resource utilized by the processor core when operating at the lower previous frequency.

If the current amount of the shared computing resource is greater than or equal to the previous amount of the shared computing resource and the current frequency is less than or equal to the previous frequency, then the setting module 116 may be configured to determine that the relationship between the current frequency and the current amount of the shared computing resource is not monotonic. Otherwise, the setting module 116 may be configured to determine that the relationship between the current frequency and the current amount of the shared computing resource is monotonic. If the relationship between the current frequency and the current amount of the shared computing resource is not monotonic, then block 608 may be followed by block 610. If the relationship between the current frequency and the current amount of the shared computing resource is monotonic, then block 608 may be followed by block 612.

At block 610 (Determine Candidate Frequency by Linear Function), the setting module 116 may be configured to determine a candidate frequency corresponding to each shared computing resource by a linear function. The linear function may be expressed mathematically as follows: $f_{i+1}=R_t/R_i*f_i$, where $f_i$ represents the current frequency, $R_t$ represents the target level of the shared computing resource, and $R_i$ represents the current amount of the shared computing resource. More generally, the setting module 116 may be configured to determine a resource ratio by dividing the target level of the shared computing resource by the current amount of the shared computing resource. The setting module 116 may be configured to determine the candidate frequency by multiplying the resource ratio and the current frequency. Block 610 may be followed by block 614.

At block 612 (Determine Candidate Frequency Quick Search), the setting module 116 may be configured to determine the candidate frequency corresponding to each shared computing resource by quick search. Under the quick search, the setting module 116 may be configured to generate a linear interpolation between a current point and a previous point. The coordinates of the current point may include the current frequency and the current amount of the shared computing resource. The coordinates of the previous point may include the previous frequency and the previous amount of the shared computing resource. The setting module 116 may be configured to identify an intersection point between the linear interpolation and the target level. The coordinates of the intersection point may include the candidate frequency and the target level of the shared computing resource. Block 612 may be followed by block 614.

At block 614 (Select Minimum Candidate Frequency from Multiple Candidate Frequencies), the setting module 116 may be configured to select a minimum candidate frequency from the multiple candidate frequencies. Each shared computing resource that is considered may be associated with candidate frequency. Block 614 may be followed by block 616 on FIG. 9.

At block 616 (Candidate Frequency<Lowest Frequency?), the setting module 116 may be configured to determine whether the minimum candidate frequency is less than the lowest frequency at which the processor core can operate. If the minimum candidate frequency is less than the lowest frequency at which the processor core can operate, then block 616 may be followed by block 618. If the minimum candidate frequency is not less than the lowest frequency at which the processor can operate, then block 616 may be followed by block 622.

At block 618 (Set Frequency as Lowest Frequency), the setting module 116 may be configured to set the processor core to operate at the lowest frequency at which the processor core can operate. Block 618 may be followed by block 620.

At block 620 (Activate or Maintain Hardware Partition), the setting module 116 may be configured to activate or maintain a hardware partition adapted to limit the maximum utilization of each shared computing resource. For example, the QOS module 106 may be configured to form the hardware partition. The setting module 116 may be configured to communicate with the QOS module 106 to activate and/or deactivate the hardware partition. In some embodiments, the setting module 116 may be configured to instruct the QOS module 106 to deactivate the hardware partition when the process 600 converges to the desired frequency. After block 620, the process 600 either repeat (e.g., periodically, continuously, or on demand as needed) or terminate.

At block 622 (Candidate Frequency>Highest Frequency), the setting module 116 may be configured to determine whether the minimum candidate frequency is greater than the highest frequency at which the processor can operate. If the minimum candidate frequency is greater than the highest frequency at which the processor core can operate, then block 622 may be followed by block 624. If the minimum candidate frequency is not greater than the highest frequency at which the processor core can operate, then block 622 may be followed by block 626.

At block 624 (Set Frequency as Highest Frequency), the setting module 116 may be configured to set the processor core to operate at the highest frequency at which the processor core can operate. After block 624, the process 600 either repeat (e.g., periodically, continuously, or on demand as needed) or terminate.

At block 626 (Set Frequency as Candidate Frequency), the setting module 116 may be configured to set the processor core to operate at the minimum candidate frequency. Block 626 may be followed by block 628.

At block 628 (Identify New Amount of Resource Utilized by Processor Core When Operating at Candidate Frequency), the setting module 116 may be configured to identify a new amount of each shared computing resource that is utilized by the processor core when operating at the minimum candidate frequency. The current frequency may be assigned as the new previous frequency, and the minimum candidate frequency may be assigned as the new current frequency. Block 628 may be followed by block 608 on FIG. 8.

Figure 10:
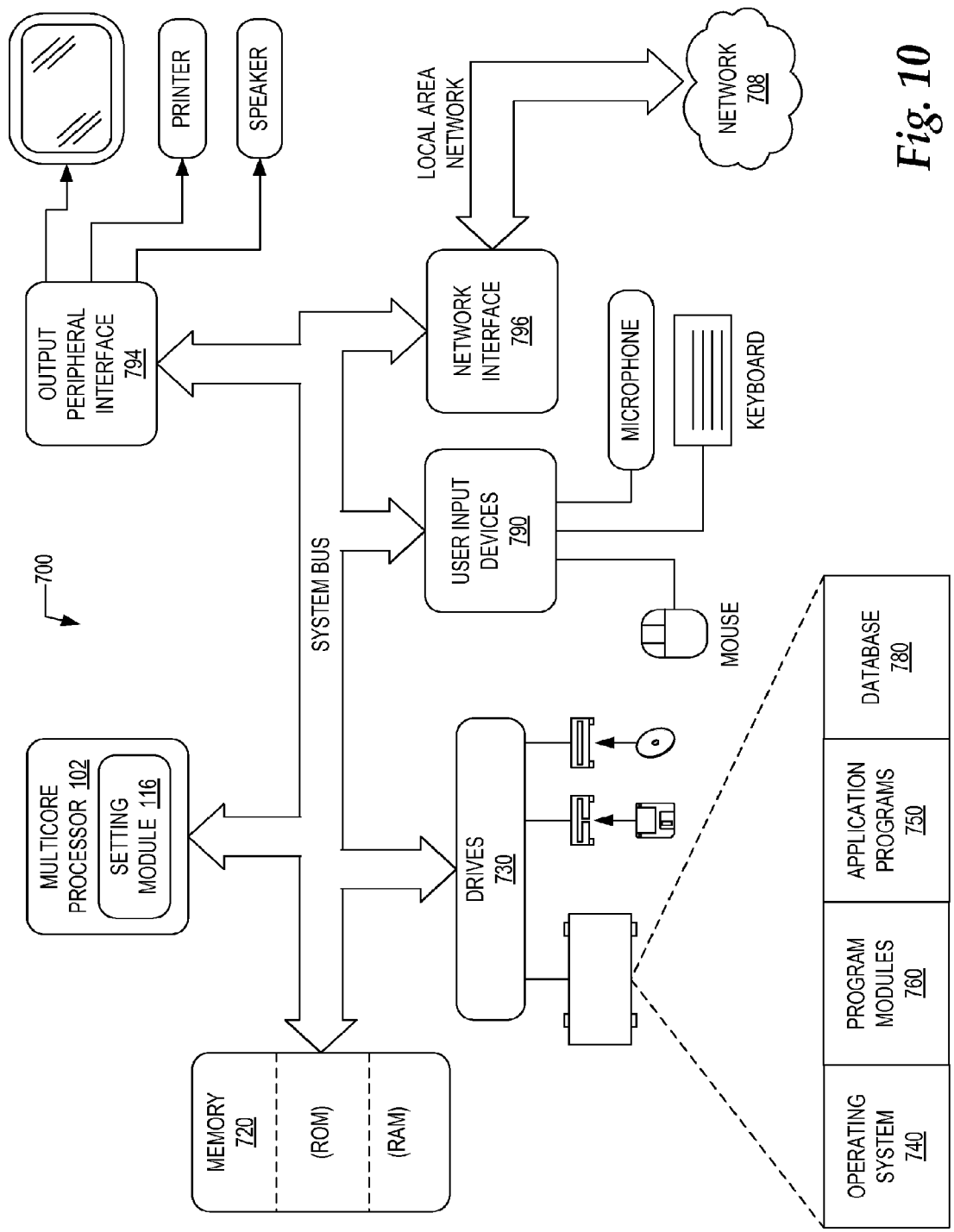
FIG. 10 is a block diagram illustrating a computer hardware architecture for an example computing system.

FIG. 10 is a block diagram illustrating a computer hardware architecture for an example computing system, arranged in accordance with at least some embodiments presented herein. FIG. 10 includes a computer 700, including a multi-core processor 102, memory 720, and one or more drives 730. The computer 700 may be implemented as a conventional computer system, an embedded control computer, a laptop, or a server computer, a mobile device, a set-top box, a kiosk, a vehicular information system, a mobile telephone, a customized machine, or other hardware platform. The multicore processor 102 may be configured to implement the logic described in FIG. 1 including the setting module 116. The setting module 116 may be configured to implement one or more processes as described in FIGS. 6-9.

The drives 730 and their associated computer storage media, provide storage of computer readable instructions, data structures, program modules and other data for the computer 700. The drives 730 can include an operating system 740, application programs 750, program modules 760, and a database 780. The computer 700 further includes user input devices 790 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the multicore processor 102 through a user input interface that is coupled to a system bus, but may be coupled by other interface and bus structures, such as a parallel port, game port or a universal serial bus ("USB"). Computers such as the computer 700 may also include other peripheral output devices such as speakers, which may be coupled through an output peripheral interface 794 or the like.

The computer 700 may operate in a networked environment using logical connections to one or more computers, such as a remote computer coupled to a network interface 796. The remote computer may be a personal computer, a server, a router, a network PC, a peer device or other common network node, and can include many or all of the elements described above relative to the computer 700. Networking environments are commonplace in offices, enterprise-wide area networks ("WAN"), local area networks ("LAN"), intranets, and the Internet.

When used in a LAN or WLAN networking environment, the computer 700 may be coupled to the LAN through the network interface 796 or an adapter. When used in a WAN networking environment, the computer 700 typically includes a modem or other means for establishing communications over the WAN, such as the Internet or the network 708. The WAN may include the Internet, the illustrated network 708, various other networks, or any combination thereof. It will be appreciated that other mechanisms of establishing a communications link, ring, mesh, bus, cloud, or network between the computers may be used.

According to some embodiments, the computer 700 may be coupled to a networking environment. The computer 700 may include one or more instances of a physical computer-readable storage medium or media associated with the drives 730 or other storage devices. The system bus may enable the multicore processor 102 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 720, whether characterized as RAM, ROM, flash, or other types of volatile or nonvolatile memory technology. The media may also represent secondary storage, whether implemented as the storage drives 730 or otherwise. Hard drive implementations may be characterized as solid state, or may include rotating media storing magnetically-encoded information.

The storage media may include one or more program modules 760. The program modules 760 may include software instructions that, when loaded into the multicore processor 102 and executed, transform a general-purpose computing system into a special-purpose computing system. As detailed throughout this description, the program modules 760 may provide various tools or techniques by which the computer 700 may participate within the overall systems or operating environments using the components, logic flows, and/or data structures discussed herein.

The multicore processor 102 may be constructed from any number of transistors or other circuit elements, which may individually or collectively assume any number of states. More specifically, the multicore processor 102 may operate as a state machine or finite-state machine. Such a machine may be transformed to a second machine, or specific machine by loading executable instructions contained within the program modules 760. These computer-executable instructions may transform the multicore processor 102 by specifying how the multicore processor 102 transitions between states, thereby transforming the transistors or other circuit elements constituting the multicore processor 102 from a first machine to a second machine. The states of either machine may also be transformed by receiving input from the one or more user input devices 790, the network interface 796, other peripherals, other interfaces, or one or more users or other actors. Either machine may also transform states, or various physical characteristics of various output devices such as printers, speakers, video displays, or otherwise.

Encoding the program modules 760 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 760 may transform the physical state of the semiconductor memory 720 when the software is encoded therein. For example, the software may transform the state of transistors, capacitors, or other discrete circuit elements constituting the semiconductor memory 720.

As another example, the storage media may be implemented using magnetic or optical technology such as drives 730. In such implementations, the program modules 760 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the Detailed Description, claims, or Figures, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to adapt a processor core on a multicore processor of a computer to achieve a quality of service target, the method comprising:
   identifying a target level of a resource on the computer;
   identifying a first utilization value of the resource when the processor core is configured to operate at a first frequency;
   identifying a second utilization value of the resource when the processor core is configured to operate at a second frequency;
   generating a linear interpolation between a first point and a second point, the first point having first coordinates including the first frequency and the first utilization value, the second point having second coordinates including the second frequency and the second utilization value;
   identifying an intersection point between the linear interpolation and the target level, the intersection point having intersection coordinates including a third frequency and the target level; and
   setting the processor core to operate at the third frequency in the identified intersection point.

2. The method of claim 1, wherein the target level is specified in a SLA between a provider of the multicore processor and a user of the processor core.

3. The method of claim 1, wherein the resource comprises off-chip memory bandwidth, and
   wherein the first utilization value of the resource comprises an amount of the off-chip memory bandwidth that is utilized when the processor core operates at the first frequency.

4. The method of claim 1, wherein the resource comprises cache memory shared by a plurality of processor cores on the multicore processor; and wherein the first utilization value of the resource comprises an amount of the cache memory that is utilized when the processor core operates at the first frequency.

5. The method of claim 1, wherein the resource comprises power, and
   wherein the first utilization value of the resource comprises an amount of the power that is utilized by the processor core when the processor core operates at the first frequency.

6. The method of claim 1, wherein identifying the first utilization value of the resource comprises:
   setting the processor core to operate at the first frequency; and
   upon setting the processor core to operate at the first frequency, determining the first utilization value of the resource when the processor core is configured to operate at the first frequency.

7. The method of claim 1, further comprising:
   generating a resource ratio based on division of the target level by the first utilization value; and
   determining the second frequency based on multiplication of the first frequency and the resource ratio.

8. The method of claim 1, wherein identifying the second utilization value of the resource comprises:
   setting the processor core to operate at the second frequency; and
   upon setting the processor core to operate at the second frequency, determining the second utilization value of the resource when the processor core is configured to operate at the second frequency.

9. The method of claim 1, further comprising:
   determining whether the third frequency is less than a lowest frequency of the processor core; and
   responsive to determining that the third frequency is less than the lowest frequency of the processor core, setting the processor core to operate at the lowest frequency and activating a partition of the resource, the partition adapted to limit utilization of the resource to the target level.

10. The method of claim 1, further comprising:
    determining whether the third frequency is greater than a highest frequency of the processor core; and
    responsive to determining that the third frequency is greater than the highest frequency of the processor core, setting the processor core to operate at the highest frequency.

11. The method of claim 10, further comprising:
    identifying a third utilization value of the resource when the processor core is configured to operate at the third frequency; and
    responsive to determining that the third frequency is not greater than the highest frequency of the processor core,
       generating a second linear interpolation between a third point and the second point, the third point having third coordinates including the third frequency and the third utilization value,
       identifying a second intersection point between the second linear interpolation and the target level, the second intersection point having second intersection coordinates including a fourth frequency and the target level, and
       setting the processor core to operate at the fourth frequency identified in the second intersection point.

12. The method of claim 1, wherein setting the processor core to operate at the third frequency comprises:
    determining whether the second utilization value is greater than or equal to the first utilization value or less than or equal to the first utilization value;
    determining whether the second frequency is less than or equal to the first frequency or greater than or equal to the first frequency;
    responsive to determining that the second utilization value is greater than or equal to the first utilization value and the second frequency is less than or equal to the first frequency,
       generating a resource ratio by dividing the second utilization value from the target level,
       generating a non-monotonic frequency by multiplying the second frequency and resource ratio, and
       setting the processor core to operate at the non-monotonic frequency; and
    responsive to determining that either the second utilization value is less than the first utilization value or the second frequency is greater than the first frequency, setting the processor core to operate at the third frequency.

13. The method of claim 1, where the first frequency, the second frequency, and the third frequency each correspond to a separate predefined voltage setting of the processor core.

14. A method that adapts a processor core on a multicore processor of a computer to achieve a quality of service target, the method comprising:
    identifying a first target level of a first resource on the computer;
    identifying a second target level of a second resource on the computer;

identifying a first utilization value of the first resource when the processor core is configured to operate at a first frequency;

identifying a second utilization value of the first resource when the processor core is configured to operate at a second frequency;

identifying a third utilization value of the second resource when the processor core is configured to operate at the first frequency;

identifying a fourth utilization value of the second resource when the processor core is configured to operate at the second frequency;

generating a first linear interpolation between a first point and a second point, the first point having first coordinates including the first frequency and the first utilization value, the second point having second coordinates including second frequency and the second utilization value;

identifying a first intersection point between the first linear interpolation and the first target level, the first intersection point having first intersection coordinates including a first candidate frequency and the first target level;

generating a second linear interpolation between a third point and a fourth point, the third point having third coordinates including the first frequency and the third utilization value, the fourth point having fourth coordinates including the second frequency and the fourth utilization value;

identifying a second intersection point between the second linear interpolation and the second target level, the second intersection point having second intersection coordinates including a second candidate frequency and the second target level;

determining a third frequency by selecting a minimum between the first candidate frequency and the second candidate frequency; and upon determining the third frequency, setting the processor core to operate at the third frequency.

15. The method of claim 14, wherein the first target level and the second target level are specified in a SLA between a provider of the multicore processor and a user of the processor core.

16. The method of claim 14, wherein the first resource comprises off-chip memory bandwidth and the second resource comprises cache memory shared by a plurality of processor cores on the multicore processor, wherein the first utilization value of the first resource comprises an amount of the off-chip memory bandwidth that is utilized when the processor core operates at the first frequency, and wherein the third utilization value of the second resource comprise an amount of the cache memory that is utilized when the processor core operates at the first frequency.

17. The method of claim 14, further comprising:

generating a first resource ratio based on a first division of the first target level by the first utilization value;

generating a first guess frequency based on a first multiplication of the first frequency and first resource ratio;

generating a second resource ratio based on a second division of the second target level by the third utilization value;

generating a second guess frequency based on a second multiplication of the first frequency and second resource ratio; and determining the second frequency by selecting a minimum between the first guess frequency and the second guess frequency.

18. The method of claim 14, further comprising:

determining whether the third frequency is less than a lowest frequency of the processor core;

responsive to determining that the third frequency is less than the lowest frequency of the processor core, setting the processor core to operate at the lowest frequency and activating a partition of the resource, the partition adapted to limit utilization of the resource to the target level.

19. The method of claim 14, further comprising:

determining whether the third frequency is greater than a highest frequency of the processor core; and responsive to determining that the third frequency is greater than the highest frequency of the processor core, setting the processor core to operate at the highest frequency.

20. The method of claim 19, further comprising:

identifying a fifth utilization value of the first resource when the processor core is configured to operate at the third frequency;

identifying sixth utilization value of the second resource when the processor core is configured to operate at the third frequency; and responsive to determining that the third frequency is not greater than the highest frequency of the processor core, generating a third linear interpolation between a fifth point and the second point, the fifth point having fifth coordinates including the third frequency and the fifth utilization value, identifying a third intersection point between the third linear interpolation and the first target level, the third intersection point having third intersection coordinates including a third candidate frequency and the first target level, generating a fourth linear interpolation between a sixth point and the fourth point, the sixth point having sixth coordinates including the third frequency and the sixth utilization value, identifying a fourth intersection point between the fourth linear interpolation and the second target level, the fourth intersection point having fourth intersection coordinates including a fourth candidate frequency and the second target level, determining a fourth frequency by selecting a minimum between the third candidate frequency and the fourth candidate frequency, and upon determining the fourth frequency, setting the processor core to operate at the fourth frequency.

21. The method of claim 14, wherein setting the processor core to operate at the third frequency comprises:

determining whether the second utilization value is greater than or equal to the first utilization value or less than or equal to the first utilization value;

determining whether the second frequency is less than or equal to the first frequency or greater than or equal to the first frequency;

responsive to determining that the second utilization value is greater than or equal to the first utilization value and the second frequency is less than or equal to the first frequency, generating a resource ratio by dividing the second utilization value from the first target level, generating a non-monotonic frequency by multiplying the second frequency and resource ratio, and setting the processor core to operate at the non-monotonic frequency if the non-monotonic frequency is less than the second candidate frequency; and responsive to determining that the second utilization value is less than the first utilization value or the second frequency is greater than the first frequency, setting the processor core to operate at the third frequency.

22. The method of claim 14, wherein the third frequency is less than the second frequency, and
wherein the second frequency is less than the first frequency.

23. A multicore processor comprising:
a plurality of processor cores including a processor core and another processor core;
a cache memory shared by the plurality of processor cores;
an off-chip memory coupled to the plurality of processor cores; and
a frequency setting module coupled to the plurality of processors, wherein the frequency setting module is configured to:
identify a first target level, wherein the first target level is associated with an off-chip memory bandwidth connecting the multicore processor with the off-chip memory,
identify a second target level, wherein the second target level is associated with a utilization of the cache memory,
identify a first utilization value of the off-chip memory bandwidth, wherein the first utilization value is associated with a first amount of the off-chip memory bandwidth that is utilized when the processor core is configured to operate at a first frequency,
identify a second utilization value of the off-chip memory bandwidth, wherein the second utilization value is associated with a second amount of the off-chip memory bandwidth that is utilized when the processor core is configured to operate at a second frequency,
identify a third utilization value of the cache memory, wherein the third utilization value is associated with a first amount of the cache memory that is utilized when the processor core is configured to operate at the first frequency,
identify a fourth utilization value of the cache memory, wherein the fourth utilization value is associated with a second amount of the cache memory that is utilized when the processor core is configured to operate at the second frequency,
generate a first linear interpolation between a first point and a second point, the first point having first coordinates including the first frequency and the first utilization value, the second point having second coordinates including second frequency and the second utilization value,
identify a first intersection point between the first linear interpolation and the first target level, the first intersection point having first intersection coordinates including a first candidate frequency and the first target level,
generate a second linear interpolation between a third point and a fourth point, the third point having third coordinates including the first frequency and the third utilization value, the fourth point having fourth coordinates including the second frequency and the fourth utilization value,
identify a second intersection point between the second linear interpolation and the second target level, the second intersection point having second intersection coordinates including a second candidate frequency and the second target level,
determine a third frequency by selecting a minimum between the first candidate frequency and the second candidate frequency, and
when the third frequency is determined, set the processor core to operate at the third frequency.

24. The multicore processor of claim 23, wherein to set the processor core to operate at the third frequency, the frequency setting module is further configured to adjust a voltage setting of the processor core.

* * * * *